(12) United States Patent
Sung et al.

(10) Patent No.: US 12,257,654 B2
(45) Date of Patent: Mar. 25, 2025

(54) JIG DEVICE FOR LASER WELDING AND JIG SYSTEM INCLUDING THE SAME

(71) Applicant: HS R & A Co., Ltd., Gyeongsangnam-do (KR)

(72) Inventors: Seung Hoon Sung, Busan (KR); Young Jun Kim, Gyeongsangnam-do (KR); Jung Hyun Shin, Busan (KR)

(73) Assignee: HS R & A CO., LTD., Gyeongsangnam-do (KR)

( * ) Notice: Subject to any disclaimer, the term of this patent is extended or adjusted under 35 U.S.C. 154(b) by 261 days.

(21) Appl. No.: 17/994,117

(22) Filed: Nov. 25, 2022

(65) Prior Publication Data
US 2023/0166367 A1    Jun. 1, 2023

(30) Foreign Application Priority Data
Nov. 30, 2021 (KR) .................. 10-2021-0168891

(51) Int. Cl.
*B23K 37/04* (2006.01)
*B23K 26/21* (2014.01)
(Continued)

(52) U.S. Cl.
CPC .......... *B23K 37/0443* (2013.01); *B23K 26/21* (2015.10); *B23K 26/702* (2015.10); *B23K 2101/06* (2018.08)

(58) Field of Classification Search
CPC ............ B23K 2101/10; B23K 37/0276; B23K 37/0443; B23K 37/0533; B23K 26/083
See application file for complete search history.

(56) References Cited

U.S. PATENT DOCUMENTS

| | | | |
|---|---|---|---|
| 5,444,206 A * | 8/1995 | Isshiki | B23K 37/047 |
| | | | 219/125.11 |
| 9,556,983 B2 * | 1/2017 | Percival | B23K 37/0533 |

(Continued)

FOREIGN PATENT DOCUMENTS

| | | |
|---|---|---|
| CN | 206690043 U | 12/2017 |
| CN | 208342124 U | 1/2019 |

(Continued)

OTHER PUBLICATIONS

European Search Report dated Apr. 17, 2023 (9 pages) from related European Application No. 22203455.5.

(Continued)

*Primary Examiner* — Jason L Vaughan
(74) *Attorney, Agent, or Firm* — Crowell & Moring LLP; John C. Freeman

(57) ABSTRACT

A jig device for laser welding of the disclosure includes a jig body having a semi-oval shaped seating groove in which a lower side of a refrigerant pipe to which a charging port is coupled is seated; a first pressing block provided in an upper portion of one side of the jig body and having a first groove part configured to press an upper portion of one side of the refrigerant pipe and an upper portion of one side of a fixing part of the charging port at a lower surface thereof; and a second pressing block provided at an upper portion of the other side of the jig body and having a second groove part configured to press an upper portion of the other side of the refrigerant pipe and an upper portion of the other side of the fixing part of the charging port at a lower surface thereof.

12 Claims, 8 Drawing Sheets

(51) Int. Cl.
  *B23K 26/70*   (2014.01)
  *B23K 101/06*  (2006.01)

(56) References Cited

U.S. PATENT DOCUMENTS

| | | | |
|---|---|---|---|
| 10,730,139 B2* | 8/2020 | Akahoshi | B23K 26/08 |
| 10,927,991 B2* | 2/2021 | Yokoyama | B29C 66/1142 |
| 11,137,240 B1* | 10/2021 | Vickers, Jr. | B23K 37/0533 |
| 11,919,101 B2* | 3/2024 | Stock | B23K 37/0443 |
| 2017/0036309 A1 | 2/2017 | McClure | |

FOREIGN PATENT DOCUMENTS

| | | | |
|---|---|---|---|
| JP | H05-192794 | A | 8/1993 |
| JP | 3013941 | U | 7/1995 |
| JP | 2001-065772 | A | 3/2001 |
| JP | 2001-193889 | A | 7/2001 |
| JP | 2002-295776 | A | 10/2002 |
| JP | 2009-250407 | A | 10/2009 |
| JP | 2012-145230 | A | 8/2012 |
| JP | 2018-134666 | A | 8/2018 |
| KR | 10-1510160 | B1 | 4/2015 |
| KR | 10-2092588 | B1 | 3/2020 |
| KR | 10-2208526 | B1 | 1/2021 |

OTHER PUBLICATIONS

Decision of Patent dated Apr. 27, 2023 (5 pages) from Korean priority Application No. 10-2021-0168891.

\* cited by examiner

JIG DEVICE FOR LASER WELDING AND JIG SYSTEM INCLUDING THE SAME

This application is based on and claims priority under 35 U.S.C. § 119 to Korean Patent Application No. 10-2021-0168891, filed on Nov. 30, 2021, in the Korean Intellectual Property Office, the entire disclosure of which is herein incorporated by reference.

BACKGROUND OF THE INVENTION

Field of the Invention

The disclosure relates to a jig device for laser welding and a jig system including the same, and more particularly, to a jig device for laser welding and a jig system including the same for supporting a refrigerant pipe to which a charging port is coupled in order to weld, by laser, the charging port coupled to a refrigerant pipe, which is an air conditioner pipe of a vehicle.

Description of Related Art

In general, a refrigeration cycle for operating an air conditioner for a vehicle is made by circulating a refrigerant through a compressor, a condenser, an expansion valve, and an evaporator.

To this end, the compressor, the condenser, the expansion valve, and the evaporator are sequentially connected by a refrigerant pipe and a flange constituting an air conditioner piping system to form one refrigerant circulation circuit.

The refrigerant pipe and the flange constituting the conventional air conditioner piping system are produced using a metal material, such as aluminum, and are connected using a caulking method, a brazing method, and a soldering method.

For reference, the caulking method refers to a method of press-fitting the refrigerant pipe into a fastening hole of a flange after forming that expands or reduces the refrigerant pipe, and the brazing method and the soldering method refer to a method of enabling a base material and a base material to be metal-bonded to each other by melting only a filler material, such as a lead, between the base material and the base material (between the refrigerant pipe and the flange).

The refrigerant pipe is equipped with a charging valve, which is a component for charging, replenishing, or withdrawing a refrigerant. The charging valve is provided inside a charging port made of a metal material, such as aluminum, and is mounted in the refrigerant pipe through the charging port.

In this case, a fixing part for coupling the charging port to an upper portion of the refrigerant pipe in a state of being inserted into the refrigerant pipe is formed in a lower portion of the charging port, and the charging port and the refrigerant pipe are bonded to each other using a separate welding device in a state in which the fixing part is inserted in the refrigerant pipe.

However, there are the following problems in a process of bonding the conventional refrigerant pipe and charging port using a welding device.

Due to production tolerances generated in a production process of the refrigerant pipe, a minute gap is generated between an outer circumferential surface of the refrigerant pipe and a fixing part seated in the outer circumferential surface of the refrigerant pipe, and there is a problem that a bonding defect occurs therebetween due to the minute gap.

PATENT DOCUMENT

Korean Patent Publication No. 10-1510160

SUMMARY

The disclosure has been devised to solve the conventional problems as described above, and the disclosure provides a jig device for laser welding and a jig system including the same for preventing bonding defects between a refrigerant pipe and a charging port by enabling laser welding to perform in a state in which a fixing part of a charging valve is closely coupled to the refrigerant pipe.

According to an embodiment of the disclosure, a jig device for laser welding for supporting a refrigerant pipe to which a fixing part of a charging port is coupled in order to bond the fixing part of the charging port to the refrigerant pipe using laser includes a jig body having a semi-oval shaped seating groove in which a lower side of the refrigerant pipe to which the charging port is coupled is seated; a first pressing block provided in an upper portion of one side of the jig body and having a first groove part configured to press an upper portion of one side of the refrigerant pipe and an upper portion of one side of the fixing part of the charging port at a lower surface thereof; and a second pressing block provided at an upper portion of the other side of the jig body and having a second groove part configured to press an upper portion of the other side of the refrigerant pipe and an upper portion of the other side of the fixing part of the charging port at a lower surface thereof, wherein the first groove part and the second groove part are formed in a semi-oval shape to form an oval-shaped space when in contact with the seating groove, and the refrigerant pipe and the fixing part of the charging port perform the laser welding in a close contact state with each other in the oval-shaped space.

According to an embodiment of the disclosure, a jig system for laser welding includes a jig device for laser welding; a support device configured to rotatably couple and support an end portion of one side of a refrigerant pipe; and a jig rotating device disposed to be spaced apart from the support device at a predetermined gap and configured to hold and rotate one side of the laser welding jig device.

BRIEF DESCRIPTION OF THE DRAWINGS

In the drawings, the same or similar reference numerals may be used for the same or similar components.

DETAILED DESCRIPTION

Figure 1:
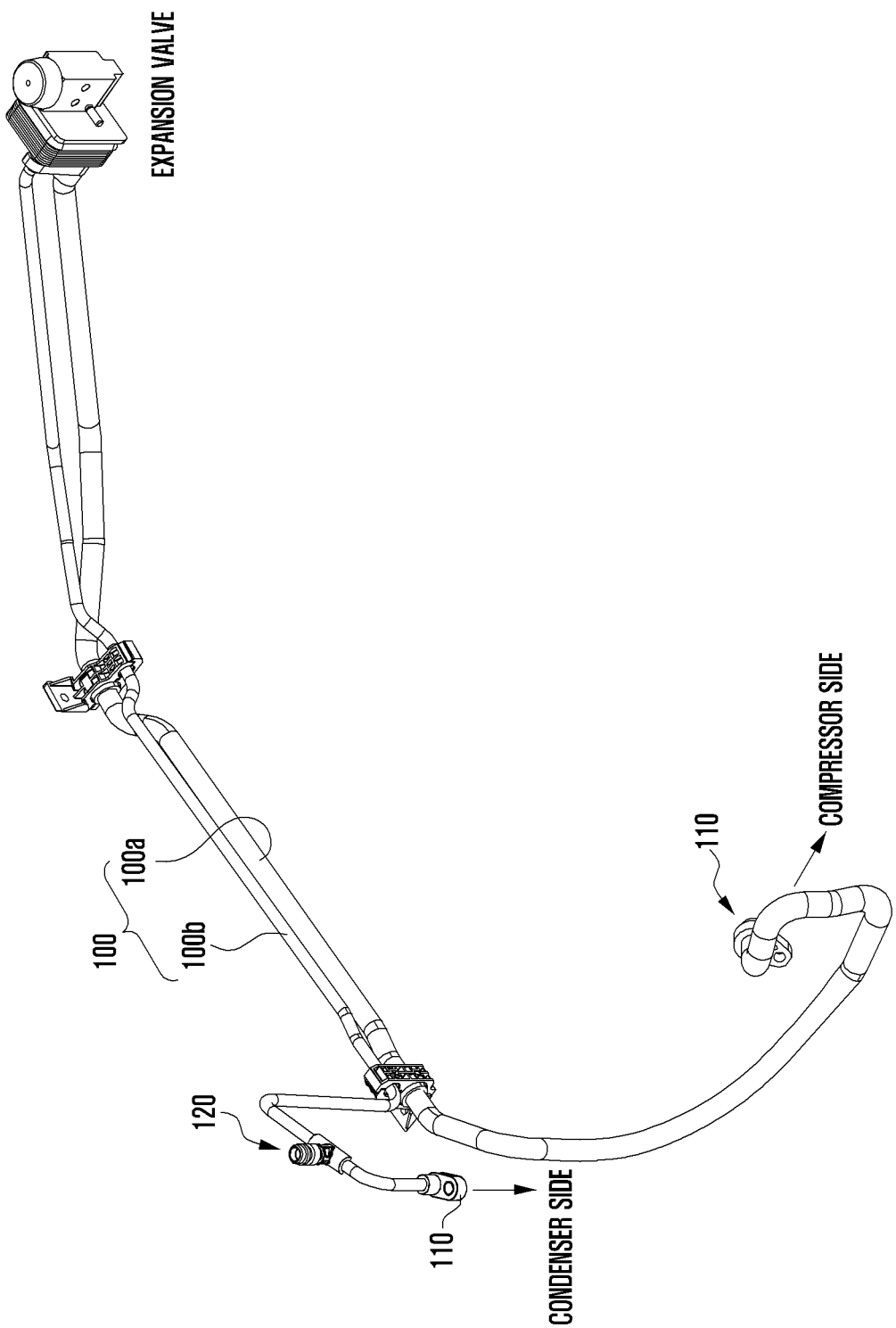
FIG. 1 is a perspective view schematically illustrating an air conditioner piping system according to an embodiment of the disclosure.

Hereinafter, preferred embodiments of the disclosure will be described in detail with reference to the accompanying drawings. In this case, it should be noted that in the accompanying drawings, the same components are denoted by the same reference numerals, if possible. Further, detailed descriptions of well-known functions and configurations that may obscure the subject matter of the disclosure will be omitted.

Hereinafter, an embodiment of the disclosure will be described with reference to the attached FIGS. 1 to 8.

Figure 2:
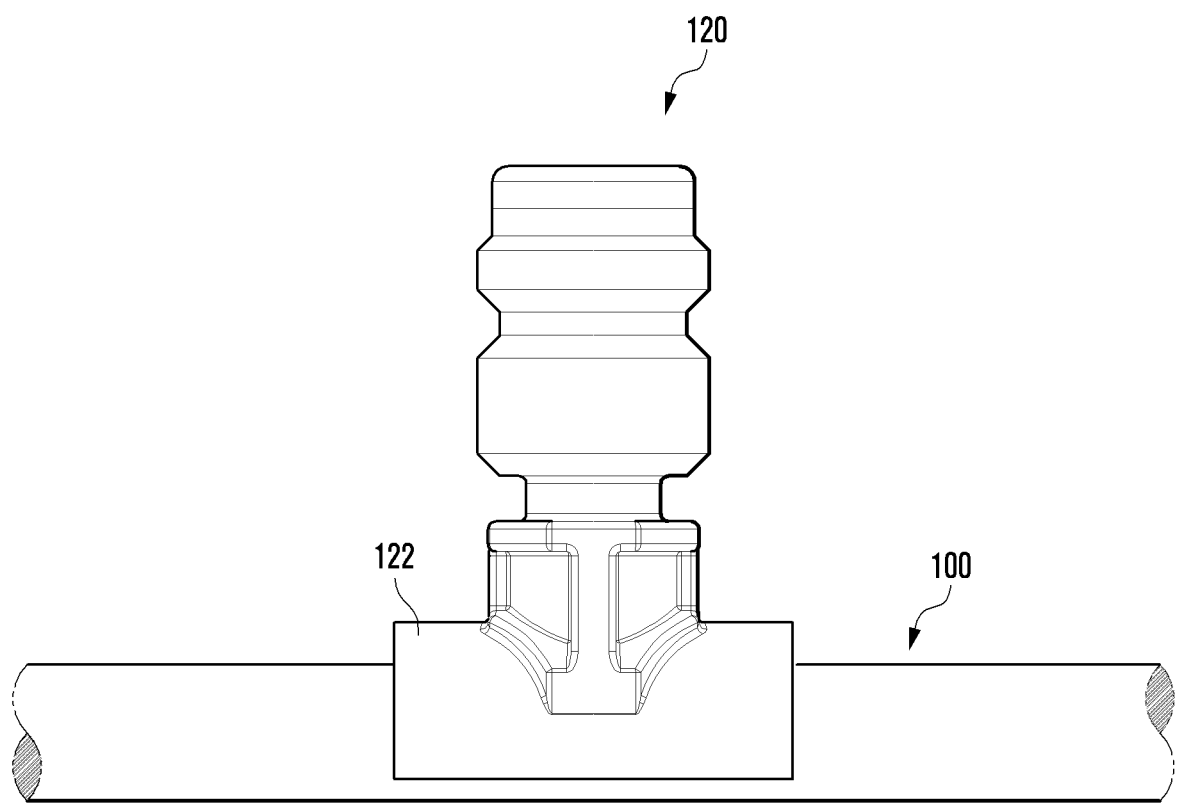
FIG. 2 is a diagram schematically illustrating a state in which a charging port is coupled to a refrigerant pipe according to an embodiment of the disclosure.
Figure 3:
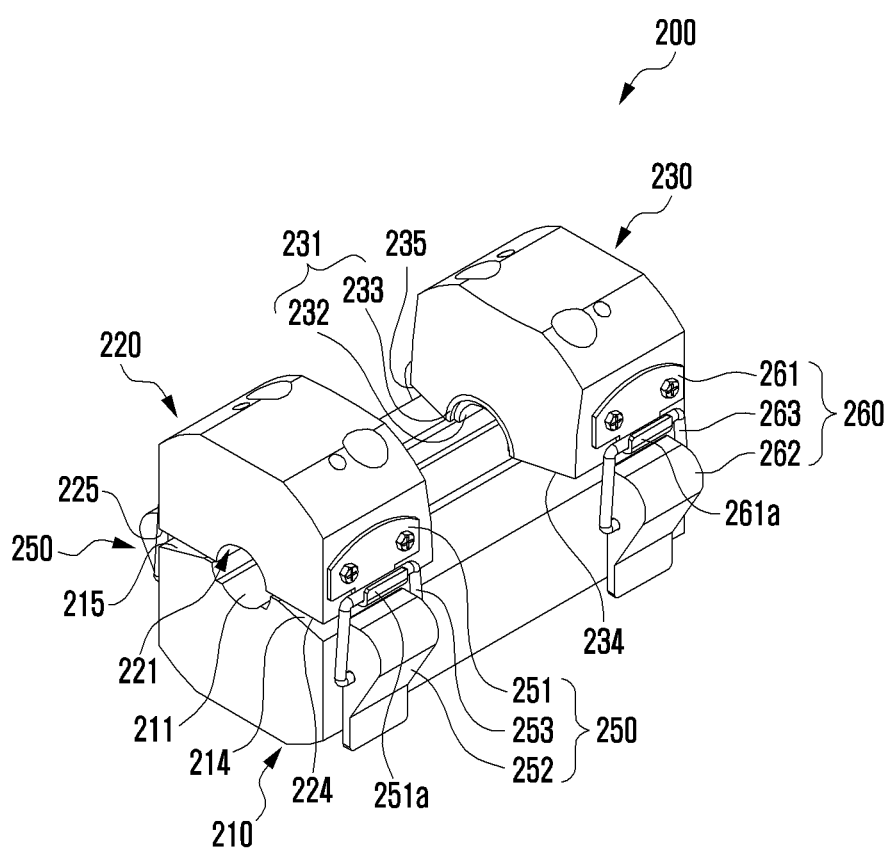
FIG. 3 is a perspective view schematically illustrating a structure of a jig device for laser welding according to an embodiment of the disclosure.

FIG. 1 is a perspective view schematically illustrating an air conditioner piping system according to an embodiment of the disclosure, FIG. 2 is a diagram schematically illustrating a state in which a charging port is coupled to a refrigerant pipe according to an embodiment of the disclosure, and FIG. 3 is a perspective view schematically illustrating a structure of a jig device for laser welding according to an embodiment of the disclosure.

Figure 4:
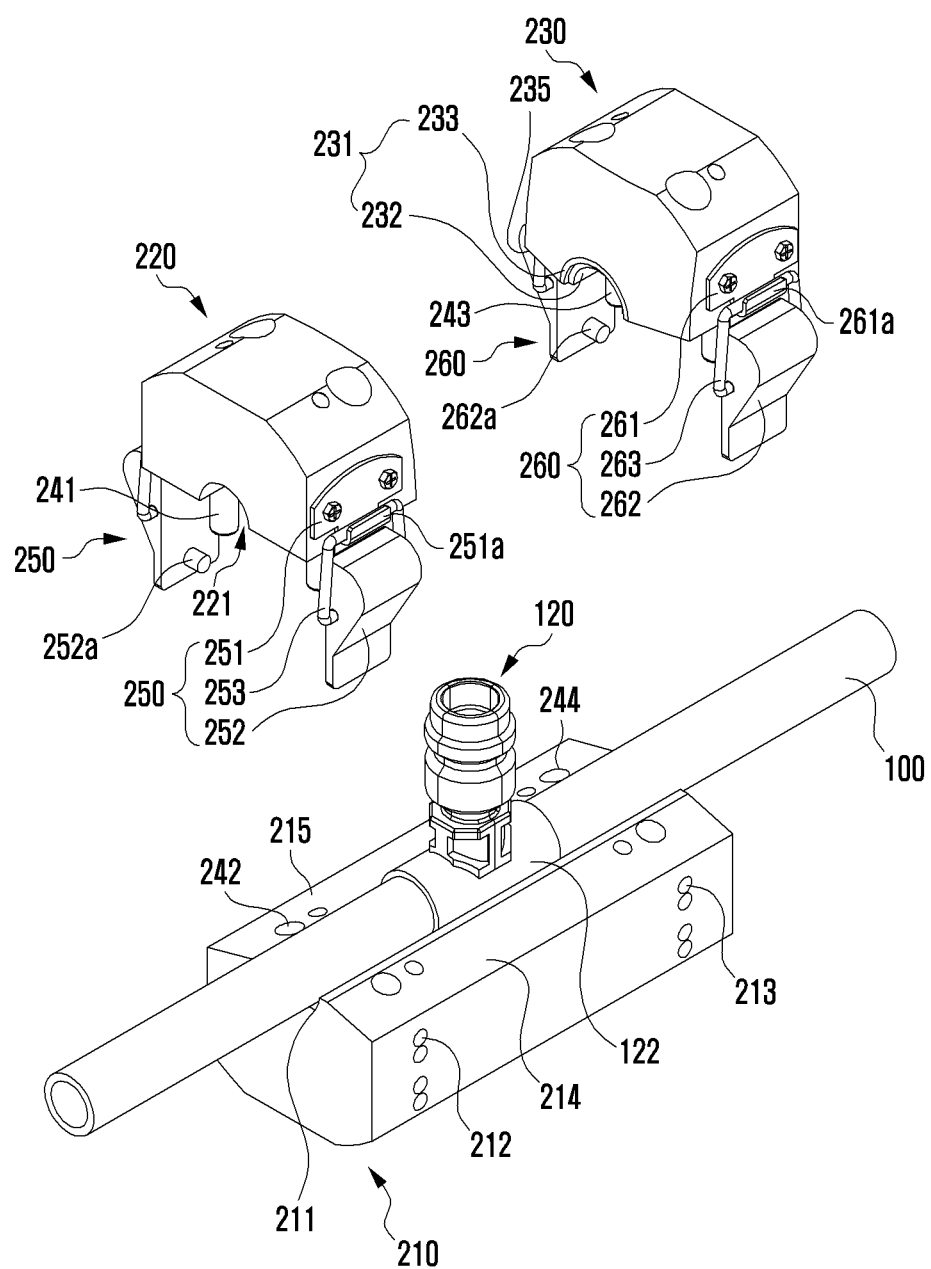
FIG. 4 is a perspective view schematically illustrating a state in which a jig body, a first pressing block, and a second pressing block are separated from a jig device for laser welding according to an embodiment of the disclosure.
Figure 5:
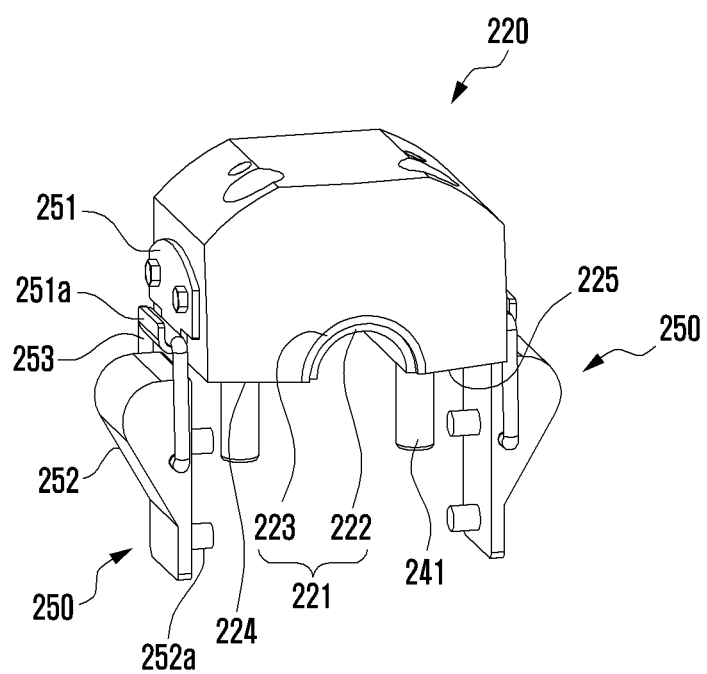
FIG. 5 is a perspective view schematically illustrating a structure of a first pressing block according to an embodiment of the disclosure.
Figure 6:
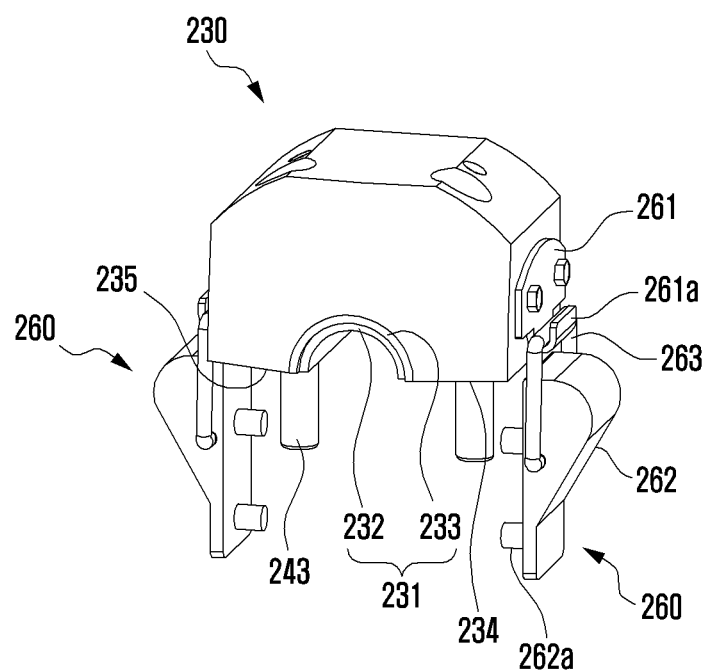
FIG. 6 is a perspective view schematically illustrating a structure of a second pressing block according to an embodiment of the disclosure.
Figure 7:
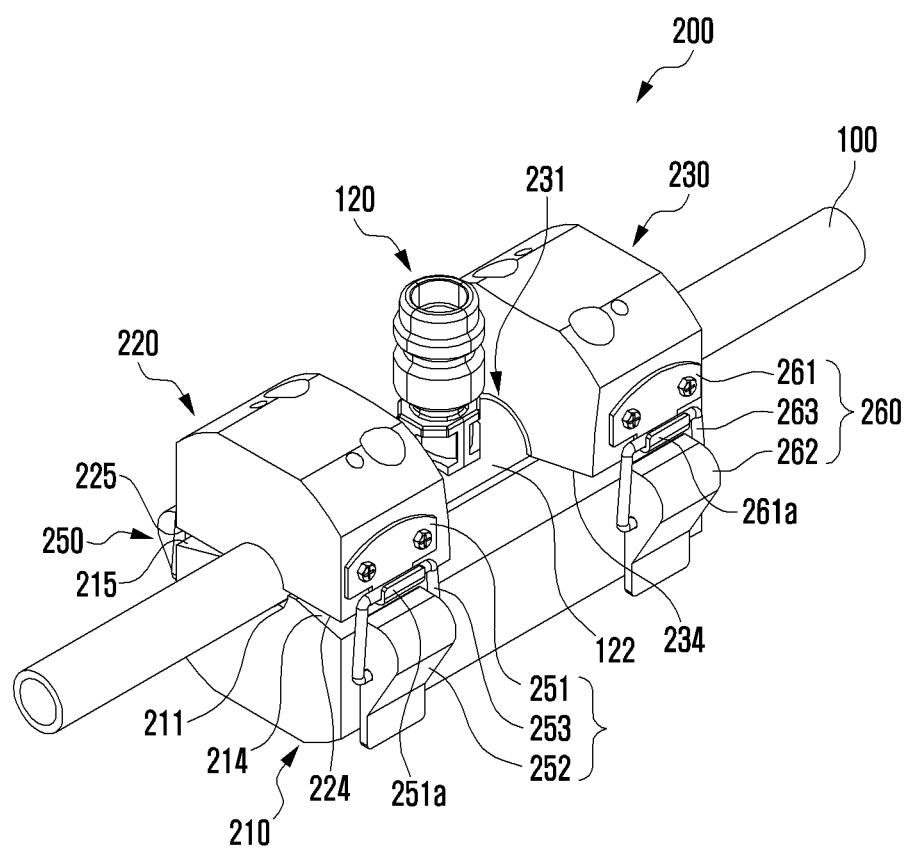
FIG. 7 is a perspective view schematically illustrating a state in which a refrigerant pipe is supported in a jig device for laser welding according to an embodiment of the disclosure.

FIG. 4 is a perspective view schematically illustrating a state in which a jig body, a first pressing block, and a second pressing block are separated from a jig device for laser welding according to an embodiment of the disclosure, FIG. 5 is a perspective view schematically illustrating a structure of a first pressing block according to an embodiment of the disclosure, FIG. 6 is a perspective view schematically illustrating a structure of a second pressing block according to an embodiment of the disclosure, and FIG. 7 is a perspective view schematically illustrating a state in which a refrigerant pipe is supported in a jig device for laser welding according to an embodiment of the disclosure.

With reference to FIGS. 3-8, a laser welding jig device 200 according to an embodiment of the disclosure may be a device used for supporting when bonding a refrigerant pipe 100, which is a component of an air conditioner piping system and a charging port 120 coupled to the refrigerant pipe 100 to each other by laser welding as shown in FIGS. 1-2.

For example, the refrigerant pipe 100 may connect a compressor and an expansion valve or connect an expansion valve and a condenser, which are components constituting an air conditioner system of a vehicle. In this case, the refrigerant pipe 100 of the air conditioner piping system may include a refrigerant pipe 100a for connecting the compressor and the expansion valve and a refrigerant pipe 100b for connecting the condenser and the expansion valve, and two refrigerant pipes 100a and 100b may be formed in the same structure, only different in diameter and length.

The refrigerant pipe 100 according to an embodiment of the disclosure is connected to enable a flow of a refrigerant to components constituting the air conditioner system through a connection flange 110 made of a plastic material.

More specifically, the connection flange 110 connects the refrigerant pipe 100, the compressor, the expansion valve, and the condenser.

Accordingly, the compressor, the condenser, the expansion valve, and the evaporator, which are components constituting the air conditioner system, are connected by the connection flange 110 and the refrigerant pipe 100 made of a plastic material to form one refrigerant circulation circuit.

According to an embodiment of the disclosure, a charging port 120 for connecting with a component for charging an insufficient refrigerant into the refrigerant pipe 100 may be coupled to the upper side of an outer circumferential surface of the refrigerant pipe 100, and such a charging port 120 may be made of a plastic material. For example, the charging port 120 may be provided with a charging valve (not illustrated) for charging a refrigerant into the refrigerant pipe 100.

According to an embodiment of the disclosure, bonding between the connection flange 110 and the refrigerant pipe 100 in a state in which the refrigerant pipe 100 is press-fitted to the connection flange 110, and bonding between the charging port 120 and the refrigerant pipe 100 in a state in which the charging port 120 is seated in an upper portion of the refrigerant pipe 100 may be made by a laser welding method using a heat by laser energy.

With reference to FIG. 2, the charging port 120 according to an embodiment of the disclosure is a component for connecting a charging valve (not illustrated) for injecting a refrigerant into the refrigerant pipe 100 through a refrigerant injection hole (not illustrated) formed in the refrigerant pipe 1M. A fixing part 122 for coupling the charging port 120 to an outer circumferential surface of the refrigerant pipe 100 may be provided at a lower portion of the charging port 120.

For example, due to a production tolerance generated in a production process of the refrigerant pipe 100, a minute gap is generated between an outer circumferential surface of the refrigerant pipe 100 and the fixing part 122 seated in the outer circumferential surface of the refrigerant pipe 100, and a bonding defect occurs therebetween due to the minute gap.

In order to prevent this, when bonding using laser, the laser welding jig device 200 of this embodiment may be used between the refrigerant pipe 100 and the fixing part 122 of the charging port 120.

Hereinafter, the laser welding jig device 200 according to an embodiment of the disclosure will be described in detail with reference to FIGS. 3 to 7.

The laser welding jig device 200 according to an embodiment of the disclosure may include a jig body 210, a first pressing block 220, and a second pressing block 230.

With reference to FIGS. 3 to 7, the jig body 210 according to an embodiment of the disclosure may seat and support the refrigerant pipe 100 for laser welding to which the fixing part 122 of the charging port 120 is coupled. A seating groove 211 in which the lower side of the refrigerant pipe 100 is seated may be provided at an upper surface of the jig body 210.

The seating groove 211 is preferably formed in a semi-oval shape rather than the same semi-circular shape as a lower portion of the refrigerant pipe 100. The feature in which the seating groove 211 is formed in a semi-oval shape will be described in detail in a process of describing a first groove part 221 and a second groove part 231 to be described later.

With reference to FIGS. 4 and 5, the first pressing block 220 according to an embodiment of the disclosure may be provided in an upper portion of one side of the jig body 210 to pressurize an upper portion of one side of the refrigerant pipe 100 seated in the seating groove 211 of the jig body 210 and an upper portion of one side of the fixing part 122 of the charging port 120 coupled to the upper portion of the refrigerant pipe 100.

In this case, at the lower surface of the first pressing block 220, the first groove part 221 for pressing an upper portion of one side of the refrigerant pipe 100 and an upper portion of one side of the fixing part 122 of the charging port 120 may be provided, and the first groove part 221 may be formed in a semi-oval shape.

When the seating groove 211 side of the jig body 210 and the first groove part 221 side of the first pressing block 220 come into contact with each other, an oval-shaped space may be formed, and in an oval-shaped space, the refrigerant pipe 100 and the fixing part 122 of the charging port 120 arm laser welded in a close contact state by the seating groove 211 and the first groove part 221.

The first groove part 221 according to an embodiment of the disclosure may include a first pressing groove 222 and a second pressing groove 223.

The first pressing groove 222 is formed concavely in a semi-oval shape at a lower surface of the first pressing block 220 to press an upper portion of one side of the refrigerant pipe 100 seated in the seating groove 211 of the jig body 210.

The second pressing groove 223 is concavely formed with a step as much as a thickness of the fixing part 122 of the charging port 120 at the rear end side of the first pressing groove 222, but is formed in a semi-oval shape in the same way as the first pressing groove 222 to press an upper portion of one side of the fixing part 122 of the charging port 120 coupled to the refrigerant pipe 100.

More specifically, when the lower surface of the first pressing block 220 contacts the upper surface of the jig body 210, the first pressing groove 222 of the first groove part 221 presses an upper portion of one side of the refrigerant pipe 100 having the lower portion seated in the seating groove 211 of the jig body 210, and the second pressure groove 223 presses an upper portion of one side of the fixing part 122 of the charging port 120.

In this case, as the seating groove 211 formed in a semi-oval shape and the first pressing groove 222 and the second pressing groove 223 formed in a semi-oval shape press the refrigerant pipe 100 and the fixing part 122 of the charging port 120, respectively, a contact area between the refrigerant pipe 100 and the first pressing groove 222 and a contact area between the fixing part 122 of the charging port 120 and the second pressing groove 223 may be increased.

Accordingly, a close contact force between the refrigerant pipe 100 and the fixing part 122 of the charging port 120 is increased; thus, the refrigerant pipe 100 and the fixing part 122 of the charging port 120 may close contact without generating a gap.

The second pressing block 230 according to an embodiment of the disclosure may be formed in substantially the same structure as that of the first pressing block 220, and be disposed to face each other at a position spaced apart from the first pressing block 220 by a predetermined distance.

With reference to FIGS. 4 and 6, the second pressing block 230 according to an embodiment of the disclosure may be provided in an upper portion of the other side of the jig body 210 to press an upper portion of the other side of the refrigerant pipe 100 seated in the seating groove 211 and an upper portion of the other side of the fixing part 122 of the charging port 120 coupled to the upper portion of the refrigerant pipe 100.

In this case, the second groove part 231 for pressing the upper portion of the other side of the refrigerant pipe 100 and the upper portion of one side of the fixing part 122 of the charging port 120 may be provided in the lower surface of the second pressing block 230, and the second groove part 231 may be formed in a semi-oval shape.

When the seating groove 211 side of the jig body 210 and the second groove part 231 side of the second pressing block 230 come into contact with each other, an oval-shaped space may be formed, and the refrigerant pipe 100 and the fixing part 122 of the charging port 120 are laser welded in a close contact state by the seating groove 211 and the second groove part 231 on such an oval-shaped space.

The second groove part 231 according to an embodiment of the disclosure may include a third pressing groove 232 and a fourth pressing groove 233. The second groove part 231 has the same constitution and function as those of the above-described first groove part 221; thus, a detailed description thereof will be omitted.

The third pressing groove 232 is formed concavely in a semi-oval shape at a lower surface of the second pressing block 230 to press an upper portion of the other side of the refrigerant pipe 100 seated in the jig body 210.

The fourth pressing groove 233 is formed concavely with a step as much as a thickness of the fixing part 122 of the charging port 120 at the rear end side of the third pressing groove 232, but is formed in a semi-oval shape in the same way as the third pressing groove 232 to press an upper portion of the other side of the fixing part 122 of the charging port 120 coupled to the refrigerant pipe 100.

As a result, in the laser welding jig device 200, as the seating groove 211, the first groove part 221, and the second groove part 231 are formed in a semi-oval shape, an outer circumferential surface of the refrigerant pipe 100 and an inner circumferential surfaces of the fixing part 122 of the charging port 120 are laser welded in a close contact state without generating a gap therebetween; thus, a bonding defect may be prevented from occurring therebetween.

With reference back to FIG. 4, when the first pressing block 220 and the second pressing block 230 are coupled to the jig body 210, the laser welding jig device 200 according to an embodiment of the disclosure may further include a positioning means for accurately matching a pressing position of the charging port 120 pressed by the first groove part 221 and the second groove part 231.

Such a positioning means may include at least one positioning protrusion protruded from a lower surface of the first pressing block 220 and the second pressing block 230 and at least one positioning groove formed concavely at an upper surface of the jig body 210 to be coupled to each of the positioning projections.

In this case, the positioning protrusion may include a first positioning protrusion 241 protruded from the lower surface of the first pressing block 220 and a second positioning protrusion 243 protruded from the lower surface of the second pressing block 230.

The positioning groove may include a first positioning groove 242 formed at one side (a position corresponding to the first pressing block 220) of the upper surface of the jig body 210 and a second positioning groove 244 formed in the other side (a position corresponding to the second pressing block 230) of the upper surface of the jig body 210.

Accordingly, when the first pressing block 220 and the second pressing block 230 are coupled to the jig body 210, the first positioning protrusion 241 is coupled to the first positioning groove 242, and the second positioning protrusion 243 is coupled to the second positioning groove 244; thus, the first groove part 221 and the second groove part 231 accurately match pressing positions of the pressing refrigerant pipe 100 and the fixing part 122 of the charging port 120.

With reference back to FIG. 4 to 6, the laser welding jig devices 200 according to an embodiment of the disclosure may further include a pair of first locking parts 250 mounted at side surfaces of both sides, respectively of the first pressing block 220 and for enabling the first pressing block 220 to provide a pressing force to the upper portion of one side of the fixing part 122 of the charging port 120 by selectively fastening the first pressing block 220 and the jig body 210.

Each of the pair of first locking parts 250 may include a first fixing member 251, a first locking wing 252, and a first connecting member 253.

Although not illustrated in detail, the first fixing member 251 may be mounted in the side of the first pressing block 220 using a separate fastening member.

One side of the first locking wing 252 may be rotatably connected to the first fixing member 251, and the other side thereof may be connected to the side surface of the jig body 210. In this case, a first locking protrusion 252a coupled to the first locking groove 212 formed at the side surface of the jig body 210 may be provided in the rear side of the first locking wing 252.

The first connecting member 253 has one side connected to the first fixing member 251 and the other side connected to the first locking wing 252, thereby connecting rotatably the first locking wing 252 with respect to the first fixing member 251.

In this case, a first locking part 251a may be provided at a lower end portion of the first fixing member 251 so that one side of the first connecting member 253 may be rotatably engaged.

By fastening the first pressing block 220 to the jig body 210 using the pair of first locking parts 250 formed as described above, a pressing force of the first pressing block 220 is provided to an upper portion of one side of the fixing part 122 of the charging port 120 so that the first groove part 221 formed in the first pressing block 220 may further press an upper portion of one side of the fixing part 122 of the charging port 120. Accordingly, the refrigerant pipe 100 and the upper portion of one side of the fixing part 122 of the charging port 120 may be laser welded in a more close contact state, thereby improving a bonding performance therebetween.

The laser welding jig device 200 according to an embodiment of the disclosure may further include a pair of second locking parts 260 mounted at side surfaces of both sides, respectively, of the second pressing block 230 and for enabling the second pressing block 230 to provide a pressing force to an upper portion of one side of the fixing part 122 of the charging port 120 by selectively fastening the second pressing block 230 and the jig body 210.

The pair of second locking parts 260 are different from the pair of first locking parts 250 in a mounting position (mounted in the second pressing block), but have the same structure and function as those of the pair of first locking parts 250; thus, a detailed description thereof will be omitted.

Each of the pair of second locking parts 260 may include a second fixing member 261, a second locking wing 262, and a second connecting member 263.

Although not illustrated in detail, the second fixing member 261 may be mounted in a side surface of the second pressing block 230 using a separate fastening member.

One side of the second locking wing 262 may be rotatably connected to the second fixing member 261, and the other side thereof may be connected to a side surface of the jig body 210. In this case, a second locking protrusion 262a coupled to the second locking groove 213 formed in the side surface of the jig body 210 may be provided at the rear side of the second locking wing 262.

The second connecting member 263 has one side connected to the second fixing member 261 and the other side connected to the second locking wing 262, thereby connecting rotatably the second locking wing 262 with respect to the second fixing member 261.

In this case, a second locking part 261a may be provided at a lower end portion of the second fixing member 261 so that one side of the second connecting member 263 may be rotatably engaged.

By fastening the second pressing block 230 to the jig body 210 using a pair of second locking parts 260 formed as described above, a pressing force of the second pressing block 230 is provided in an upper portion of the other side of the fixing part 122 of the charging port 120; thus, the second groove part 231 formed in the second pressing block 230 may further press an upper portion of the other side of the fixing part 122 of the charging port 120. Accordingly, the refrigerant pipe 100 and an upper portion of the other side of the fixing part 122 of the charging port 120 may be laser welded in a more close contact state, thereby improving a bonding performance therebetween.

The first locking groove 212 and second locking groove 213 according to an embodiment of the disclosure may be formed in plural at a predetermined gap.

The plurality of first locking grooves 212 and the plurality of second locking grooves 213 may adjust a gap between the jig body 210, the first pressing block 220, and the second pressing block 230 according to a size of the refrigerant pipe 100.

More specifically, in a process of fastening the jig body 210, the first pressing block 220, and the second pressing block 230 using the first locking part 250 and the second locking part 260, when the first locking protrusion 252a and the second locking protrusion 262a are coupled to the first locking groove 212 and the second locking groove 213, respectively formed at positions corresponding to a size of the refrigerant pipe 100 among the plurality of first locking grooves 212 and second locking grooves 213, a gap between the jig body 210, the first pressing block 220, and the second pressing block 230 may be adjusted according to the size of the refrigerant pipe.

Each of a first inclined surface 214 and a second inclined surface 215 formed to be inclined downward based on the seating groove 211 may be formed in an upper surface of the jig body 210 according to an embodiment of the disclosure. In this case, the first inclined surface 214 may be formed in the front side based on the seating groove 211, and the second inclined surface 215 may be formed in the rear side based on the seating groove 211.

Further, a third inclined surface 224 and a fourth inclined surface 225 formed to be inclined upward based on the first groove part 221 may be formed in a lower surface of the first pressing block 220. In this case, the third inclined surface 224 may be formed at the front side based on the first groove part 221, and the fourth inclined surface 225 may be formed at the rear side based on the first groove part 221.

Further, as in the first pressing block 220, a fifth inclined surface 234 and a sixth inclined surface 235 formed to be inclined upward based on the second groove part 231 may be formed in an upper surface of the second pressing block 230. In this case, the fifth inclined surface 234 may be formed in the front side based on the second groove part 231, and the sixth inclined surface 235 may be formed in the rear side based on the second groove part 231.

In this case, the first inclined surface 214 formed in the jig body 210, the third inclined surface 224 formed in the first pressing block 220, and the fifth inclined surface 234 formed in the second pressing block 230 are formed to face each other, but are formed to be inclined in opposite directions.

Further, the second inclined surface 215 formed in the jig body 210, the fourth inclined surface 225 formed in the first pressing block 220, and the sixth inclined surface 235 formed in the second pressing block 220 are formed to face each other, but are formed to be inclined in opposite directions.

Therefore, in the case that the jig body 210, the first pressing block 220, and the second pressing block 230 are coupled, the upper surface of the jig body 210, the lower surface of the first pressing block 220, and the lower surface of the second pressing block 230 may be coupled to each other in a state in which the remaining portions, except for the seating groove 211, the first groove part 221, and the second groove part 231, are not in contact.

For example, in the case that the upper surface of the jig body 210, the lower surface of the first pressing block 220, and the lower surface of the second pressing block 230 are fastened in contact with each other, a pressure provided to the first pressing block 220 and the second pressing block 230 is limited; thus, functions of the first pressing block 220 and the second pressing block 230 cannot be appropriately exerted, and as a result, a close contact force between the refrigerant pipe 100 and the fixing part 122 of the charging port 120 is inevitably reduced. Therefore, a bonding defect may occur between the refrigerant pipe 100 and the fixing part 122 of the charging port 120.

Therefore, it is preferable that the respective inclined surfaces are formed so that the upper surface of the jig body 210, the lower surface of the first pressing block 220, and the lower surface of the second pressing block 230 do not entirely contact.

Hereinafter, a laser welding jig system having a laser welding jig device according to an embodiment of the disclosure will be described in detail with reference to FIG. 8.

Figure 8:
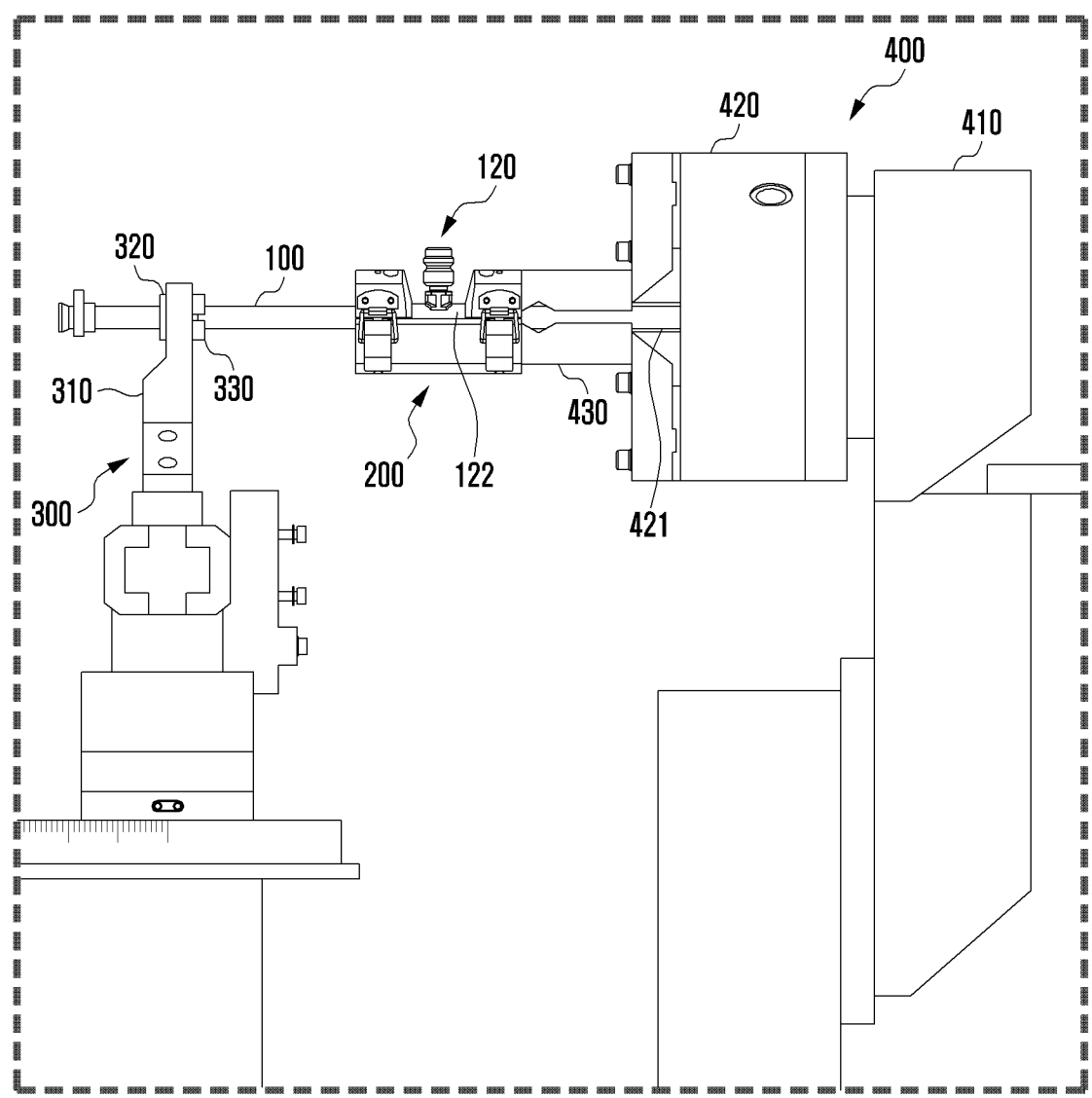
FIG. 8 is a diagram schematically illustrating a structure of a laser welding jig system including a jig device for laser welding according to an embodiment of the disclosure.

FIG. 8 is a diagram schematically illustrating a structure of a laser welding jig system according to an embodiment of the disclosure.

With reference to FIG. 8, the laser welding jig system according to an embodiment of the disclosure may perform laser welding while rotating the laser welding jig device 200 supported by the refrigerant pipe 100, as described above.

Such a laser welding jig system may include a support device 300, a laser welding jig device 200, and a jig rotating device 400.

The support device 300 according to an embodiment of the disclosure may support by rotatably coupling an end portion of one side of the refrigerant pipe 100.

In this case, a plurality of guide rollers 320 for guiding a rotation of the bearing block 310 and the refrigerant pipe 100 so as to rotate the refrigerant pipe 100 may be provided at a portion of the support device 300 to which an end portion of one side of the refrigerant pipe 100 is coupled.

The laser welding jig device 200 may be formed in the above-described structure to support the refrigerant pipe 100 and the fixing part 122 of the charging port 120 in a close contact state.

The jig rotating device 400 may hold and rotate one side of the laser welding jig device 200. The jig rotating device 400 may include a rotating device body 410, a driving unit 420, and a holding part 430.

The rotating device body 410 may be disposed to be spaced apart from the support device 300 by a predetermined gap.

The driving unit 420 may be disposed at the upper side of the rotating device body 410 to generate a rotational driving force for rotating the holding part 430 to be described later forward and reverse.

The holding part 430 may be connected to the driving unit 420, and hold a portion of one side of the laser welding jig device 200 so that the laser welding jig device 200 may be rotated forward and reverse by a rotational force of the driving unit 420.

A receiving groove 421 may be provided to receive an end portion of the other side of the refrigerant pipe 100 in a central portion of the driving unit 420.

When the laser welding jig system according to an embodiment of the disclosure is used, in a process of radiating a laser beam to the fixing part 122 side of the charging port 120 using a laser device, by rotating the laser welding jig device forward and reverse, the refrigerant pipe 10M and the fixing part 122 of the charging port 120 may be evenly bonded.

As described above, a jig device for laser welding and a jig system including the same according to the disclosure enables laser welding to be performed in a state in which a fixing part of the charging valve is closely coupled to the refrigerant pipe, thereby preventing a bonding defect between the refrigerant pipe and the charging port.

Further, as the positioning means is provided, it is possible to accurately match pressing positions of the first pressing block and the second pressing block.

Further, by enabling an upper surface of the jig body and the first pressing block and the second pressing block not to contact, a pressing force of the first pressing block and the second pressing block can be increased.

Through a jig device for laser welding and a jig system including the same according to the disclosure, the disclosure can provide the following effects.

A jig device for laser welding and a jig system including the same according to the disclosure enable laser welding to perform in a state in which a fixing part of a charging valve is closely coupled to a refrigerant pipe, thereby providing an effect of preventing a bonding defect between the refrigerant pipe and a charging port.

Further, a jig device for laser welding and a jig system including the same according to the disclosure can provide an effect of accurately matching pressing positions of a first pressing block and a second pressing block as a positioning means is provided.

Further, a jig device for laser welding and a jig system including the same according to the disclosure enable an upper surface of a jig body and a first pressing block and a second pressing block not to come into contact with each other, thereby providing an effect of increasing a pressing force of the first pressing block and the second pressing block.

Although the disclosure has been described with reference to embodiments, the disclosure is not necessarily limited thereto, and modifications and variations are possible within the scope of the technical spirit of the disclosure.

DESCRIPTION OF SYMBOLS

100: refrigerant pipe 110: connection flange
120: charging port 122: fixing part
200: laser welding jig device 210: jig body
211: seating groove 212: first locking groove
213: second locking groove 214: first inclined surface
215: second inclined surface 220: first pressing block
221: first groove part 222: first pressing groove 223: second pressing groove 224: third inclined surface
225: fourth inclined surface 230: second pressing block
231: second groove part 232: third pressing groove
233: fourth pressing groove 234: fifth inclined surface
235: sixth inclined surface 241: first positioning protrusion
242: first positioning groove 243: second positioning projection
244: second positioning groove 250: first locking part
251: first fixing member 252: first locking wing
252a: first locking protrusion 253: first connecting member
260: second locking part 261: second fixing member
262: second locking wing 262a: second locking protrusion
263: second connection part 300: support device
310: bearing block 320: guide roller
400: jig rotating device 410: rotating device body
420: driving unit 421: receiving groove
430: holding part

We claim:

1. A jig device for laser welding, for supporting a refrigerant pipe to which a fixing part of a charging port is coupled in order to bond the fixing part of the charging port to the refrigerant pipe using a laser, the jig device comprising:
    a jig body having a semi-oval shaped seating groove in which a lower side of a refrigerant pipe to which a charging port is coupled is seated;
    a first pressing block provided in an upper portion of a firstside of the jig body and having a first groove part configured to press an upper portion of a first side of the refrigerant pipe and an upper portion of a first side of a fixing part of the charging port at a lower surface thereof; and
    a second pressing block provided at an upper portion of a second side of the jig body and having a second groove part configured to press an upper portion of a second side of the refrigerant pipe and an upper portion of a second side of the fixing part of the charging port at a lower surface thereof,
    wherein the first groove part and the second groove part are formed in a semi-oval shape to form an oval-shaped space when in contact with the semi-oval shaped seating groove, and the refrigerant pipe and the fixing part of the charging port are laser welded in a close contact state with each other in the oval-shaped space.

2. The jig device of claim 1, wherein the first groove part has:
    a first pressing groove formed concavely in a semi-oval shape at a lower surface of the first pressing block to press the upper portion of the first side of the refrigerant pipe; and
    a second pressing groove formed concavely, and formed in a semi-oval shape with a step as much as a thickness of the fixing part of the charging port at a rear end side of the first pressing groove and configured to press an upper portion of the first side of the fixing part of the charging port.

3. The jig device of claim 1, wherein the second groove part has:
    a third pressing groove formed concavely in a semi-oval shape at a lower surface of the second pressing block to press the upper portion of the second side of the refrigerant pipe; and
    a fourth pressing groove formed concavely, and formed in a semi-oval shape with a step as much as a thickness of the fixing part at a front end side of the third pressing groove and configured to press the upper portion of the second side of the fixing part of the charging port.

4. The jig device of claim 1, further comprising a positioner configured to accurately match a pressing position of the charging port pressed by the first groove part and the second groove part when the first pressing block and the second pressing block are coupled to the jig body,
    wherein the positioner comprises:
    a first positioning protrusion configured to protrude from a lower surface of the first pressing block and a second positioning protrusion configured to protrude from a lower surface of the second pressing block; and
    a positioning groove formed concavely at an upper surface of the jig body and to which the first positioning projection and the second positioning projection are coupled.

5. The jig device of claim 1, further comprising:
    a pair of first locking parts mounted at a pair of side surfaces, respectively, of the first pressing block and configured to selectively fasten the first pressing block and the jig body to provide a pressing force to the upper portion of the first side of the fixing part of the charging port; and
    a pair of second locking parts mounted at a pair of side surfaces, respectively, of the second pressing block and configured to selectively fasten the second pressing block and the jig body to provide a pressing force to the upper portion of the second side of the fixing part of the charging port.

6. The jig device of claim 5, wherein each of the pair of first locking parts comprises:
    a fixing member mounted in the first pressing block;
    a locking wing rotatably connected to the fixing member and comprising a locking protrusion coupled to a locking groove formed at a side surface of the jig body; and
    a connecting member comprising a first side rotatably connected to the fixing member and a second side connected to the locking wing to rotatably connect the locking wing with respect to the fixing member.

7. The jig device of claim 6, wherein each of the pair of second locking parts comprises:
    a second fixing member in which the second pressing block is mounted;
    a second locking wing rotatably connected to the second fixing member and having a second locking protrusion coupled to a second locking groove formed at a second side surface of the jig body; and
    a second connecting member comprising a first one side rotatably connected to the second fixing member and a second side connected to the second locking wing to rotatably connect the second locking wing with respect to the second fixing member.

8. The jig device of claim 7, further comprising:
    a third locking groove separated from the first locking groove by a first predetermined gap;
    a fourth locking groove separated from the second locking groove by a second predetermined gap, wherein the first locking groove, the second locking groove, the third locking groove, and the fourth locking groove are formed in order to adjust a gap between the jig body and the first pressing block and the second pressing block according to a size of the refrigerant pipe.

9. The jig device of claim 1, wherein a first inclined surface and a second inclined surface formed to be inclined downward based on the semi-oval shaped seating groove are formed at the first side and the second side of the upper surface of the jig body, a third inclined surface and a fourth inclined surface formed to be inclined upward based on the first groove part are formed at both sides of the lower surface of the first pressing block, and a fifth inclined surface and a sixth inclined surface formed to be inclined upward based on the second groove part are formed at a first side and a second side of a lower surface of the second pressing block.

10. A jig system for laser welding comprising:

a jig device for laser welding that comprises:

a jig body having a semi-oval shaped seating groove in which a lower side of a refrigerant pipe to which a charging port is coupled is seated;

a first pressing block provided in an upper portion of a first side of the jig body and having a first groove part configured to press an upper portion of a first side of the refrigerant pipe and an upper portion of a first side of a fixing part of the charging port at a lower surface thereof; and a second pressing block provided at an upper portion of a second side of the jig body and having a second groove part configured to press an upper portion of a second side of the refrigerant pipe and an upper portion of a second side of the fixing part of the charging port at a lower surface thereof, wherein the first groove part and the second groove part are formed in a semi-oval shape to form an oval-shaped space when in contact with the semi-oval shaped seating groove, and the refrigerant pipe and the fixing part of the charging port are laser welded in a close contact state with each other in the oval-shaped space;

the jig system further comprising:

a support device configured to rotatably couple and support an end portion of the first side of the refrigerant pipe; and a jig rotating device disposed to be spaced apart from the support device at a predetermined gap and configured to hold and rotate one side of the jig device.

11. The jig system of claim 10, wherein the jig rotating device comprises:

a rotating device body;

a driving unit disposed at an upper side of the rotating device body to generate a rotating driving force; and a holding part connected to the driving unit, configured to hold a portion of one side of the jig device and configured to rotate the jig device forward and reverse by an operation of the driving unit.

12. The jig system of claim 11, wherein a receiving groove is provided to receive an end portion of the second side of the refrigerant pipe in a central portion of the driving unit.

\* \* \* \* \*